United States Patent [19]

Ackermann

[11] Patent Number: 4,735,753
[45] Date of Patent: Apr. 5, 1988

[54] METHOD OF MAKING A FASTENER

[76] Inventor: Walter T. Ackermann, 159 Fern Hill Rd., Watertown, Conn. 06795

[21] Appl. No.: 889,880

[22] Filed: Jul. 28, 1986

[51] Int. Cl.[4] ............... A44B 1/02; B06B 3/00; B29B 43/18; B29B 43/34

[52] U.S. Cl. ............... 264/23; 24/90 C; 24/90 HA; 24/104; 24/682; 156/66; 156/73.1; 156/580.1; 264/40.1; 264/68; 264/157; 264/251; 264/252; 264/257; 264/320; 264/322; 264/324; 425/174.2

[58] Field of Search ............... 264/23, 157, 251, 252, 264/257, 259, 320, 322, 324, 68, 40.1; 425/814, DIG. 34, 174.2; 156/73.1, 580.1, 66; 24/90 A, 90 C, 90 HA, 104, 682

[56] References Cited

U.S. PATENT DOCUMENTS

| | | | |
|---|---|---|---|
| 2,082,619 | 6/1937 | Dau | 264/320 X |
| 2,336,192 | 12/1943 | Rouse . | |
| 2,458,152 | 1/1949 | Eakins . | |
| 2,470,963 | 5/1949 | Weyl . | |
| 2,525,842 | 10/1950 | Slamon et al. . | |
| 2,548,004 | 4/1951 | Duefrene . | |
| 2,656,541 | 10/1953 | Beaver et al. | 2/96 |
| 2,745,160 | 5/1956 | Jones . | |
| 2,801,948 | 8/1957 | Walker . | |
| 2,815,535 | 10/1957 | Bodine, Jr. . | |
| 2,824,595 | 2/1958 | Lehre . | |
| 3,019,152 | 1/1962 | Jones . | |
| 3,130,464 | 4/1964 | Barlow . | |
| 3,142,088 | 7/1964 | Cravath | 16/121 |
| 3,206,818 | 9/1965 | Knowlton . | |
| 3,238,082 | 3/1966 | Cornell . | |
| 3,416,196 | 12/1968 | Mathison . | |
| 3,447,995 | 6/1969 | Dankert et al. | 156/580 |
| 3,448,464 | 6/1969 | Jonas | 2/336 |
| 3,462,803 | 8/1969 | Horton . | |
| 3,488,239 | 1/1970 | Heimberger | 156/66 |
| 3,490,970 | 1/1970 | Heimberger | 156/66 |
| 3,499,808 | 3/1970 | Obeda . | |
| 3,500,509 | 3/1970 | Moden . | |
| 3,575,750 | 4/1971 | Sakamoto | 156/66 |
| 3,580,793 | 5/1971 | Hewitt | 156/579 |
| 3,605,241 | 9/1971 | Fish . | |
| 3,607,580 | 9/1971 | Obeda | 156/580 |
| 3,613,181 | 10/1971 | Taylor . | |
| 3,650,647 | 3/1972 | Jacobs et al. | 264/23 X |
| 3,672,806 | 6/1972 | Triolo et al. | 425/406 |
| 3,696,470 | 10/1972 | Reynolds et al. . | |
| 3,715,781 | 2/1973 | Salvatori . | |
| 3,717,427 | 2/1973 | Bodine | 425/174 |
| 3,754,310 | 8/1973 | Shea | 29/25.42 |
| 3,765,973 | 10/1973 | Kramer . | |
| 3,800,368 | 4/1974 | Simon . | |
| 3,804,577 | 4/1974 | Gaus | 425/510 |
| 3,813,459 | 5/1974 | Potin | 264/23 |
| 3,890,679 | 6/1975 | Simon | 264/252 X |
| 3,899,116 | 8/1975 | Mims | 228/110 |
| 3,911,074 | 10/1975 | Kessler | 264/318 |
| 3,951,715 | 4/1976 | Hofius | 156/66 |
| 3,962,007 | 6/1976 | Heimberger | 156/73.1 |
| 3,972,758 | 8/1976 | Bieber | 156/73.1 |
| 3,982,988 | 9/1976 | Heimberger . | |
| 3,999,255 | 12/1976 | Warburton et al. | 264/23 X |
| 4,026,974 | 5/1977 | Moertel et al. | 264/23 |
| 4,027,370 | 6/1977 | Bachar | 29/818 |
| 4,040,886 | 8/1977 | Yen et al. | 156/350 |
| 4,093,491 | 6/1978 | Whelpton et al. . | |
| 4,163,768 | 8/1979 | Stephens | 264/23 |
| 4,250,596 | 2/1981 | Hara et al. . | |
| 4,263,079 | 4/1981 | Sutrina et al. | 156/244.11 |
| 4,295,919 | 10/1981 | Sutrina et al. | 156/498 |
| 4,312,077 | 1/1982 | Petersson | 2/265 |
| 4,341,574 | 7/1982 | Landes | 156/64 |

FOREIGN PATENT DOCUMENTS 1146980  3/1969  United Kingdom .

Primary Examiner—Jeffery Thurlow
Assistant Examiner—Leo B. Tentoni
Attorney, Agent, or Firm—Hopgood, Calimafde, Kalil, Blaustein & Judlowe

[57] ABSTRACT

An article of manufacture comprises a molded-plastic fitment such as one of the halves of a snap fastener molded in situ to a porous substrate such as a garment fabric. Various embodiments are described for the article, as well as dies for forming the same, and methods and a machine for making the same.

21 Claims, 6 Drawing Sheets

PRIOR ART

CAP  STUD  SOCKET  CAP

FEED PLASTIC

CLAMP SUBSTRATE

LOWER TIP

MELT PLASTIC

SOLIDIFY PLASTIC

OPEN MOLDS

METHOD OF MAKING A FASTENER

BACKGROUND OF THE INVENTION

The invention relates to functional devices and their attachment to textile or other substrate material, as for example snap fasteners for articles of clothing, disposable garments, and the like.

Conventional methods of attaching a functional part to a substrate or foundation material usually involve the two separate steps of (a) fabricating the functional part as a discrete item, and (b) attaching the functional part to the substrate or foundation material. Attachment can utilize a surface effect, as via an adhesive, welding, brazing, and soldering; or the substrate can be pierced to accommodate threaded, riveted or swaged projections, or the like.

The invention is regarded as applicable to a wide variety of functional-attachment situations but to simplify present description, the context of use of the invention will primarily concern "snap fasteners", employed as detachable closure devices in the apparel industry. Such snap fasteners have come in many varieties, but they are illustrative of conventional practice requiring prefabrication of discrete parts, usually of steel, brass, or plastic resin, the same being attached to fabric by piercing and joining to a companion part, or "cap".

Current technology involves the fabrication of snap fasteners as a separate operation, in a first industry or manufacturing facility; the fabricated fastener parts are supplied to another industry or manufacturing facility where fastener parts are manipulated in relation to a fabric and are then attached to the fabric. A typical fastener consists of a "set" of four parts, as shown in FIG. 1, namely, as indicated by legend, stud and socket parts which are separably engageable by snap fit, and a cap part for securing each of the stud and socket parts to its particular garment region. When the four-part fastener is of molded plastic, the snap action of separable engagement is occasioned by compliantly yielding interference as the bulbous stud traverses the entrance to the hollow of the socket; when such a fastener is of metal, the yielding interference is realized by segmenting the socket geometry into individual spring fingers, or by the use of wire rings or other compliantly deformable shapes.

The operative stud and socket parts of FIG. 1 are shown securable to fabric via cap prongs which pierce the fabric, but this is but one of various fabric-piercing cap techniques which are conventional, for example, metal caps with projecting eyelet, prong-cage or staple formations, or molded-plastic caps with projecting post or prong formations. In every case, four parts must be separately fabricated, the fabric must be pierced, and an upsetting, curling or swaging operation is needed to clinch the cap and operative fastener part so as to sandwich its fabric foundation.

Quality of attachment is of key importance in producing a satisfactory fastener, and most development work in the industry has been directed toward obtaining more secure attachment to the substrate; for example, it is a common practice to fold the fabric into several layers of thickness, with insertion of one or more layers of reinforcing material, to provide better integrity for the sandwiched cap-secured stud or socket part. But with repeated engagement/disengagement cycling of the fastener, lateral forces tend to pull or tear the fabric through the "sandwich". Tightly woven cotton and blend fabrics are more resistant to tear, while synthetic knits and solid sheets are more readily damaged. Metal snaps can be tightly clinched to create a clamping action, or "pinch", on the fabric. But a pinching clamp is not readily achievable with plastic fastener parts, due to inherent resilience of the plastic material.

The need for four parts in a snap-fastener "set" has created an aesthetic requirement. The industry has decorated the non-functional parts (i.e., caps) with designs and geometries to enhance appearance on the face side of the garment. In some cases, design orientation is important, thus dictating another positional or orientation requirement.

The attachment of snap fasteners requires special machinery, which varies in complexity, from simple foot-operated presses to electrically or pneumatically driven units which automatically feed, orient and attach a stud or socket part to its companion cap, eyelet, staple or prong. The operator inserts and locates the garment and triggers the machine, which feeds the active part on one side, the inactive part on the other, and clinches them together. Further sophistication involves feeding the garment through the machine automatically, and attaching multiple snaps. These machines are usually leased to the user on an annual basis, and must be serviced by trained mechanics. Attaching machines now on the market are not readily converted to other sizes or types of fasteners. In many cases, a seasonal garment requirement calls for short use and is then left idle, while the leasing cost continues.

Cost is a primary factor for relevant comparison of the present invention. Typical four-part metal snap fasteners range in price from $40.00 to $100.00 per thousand sets, and plastic fasteners range from $15.00 to $50.00 per thousand sets.

The current market for snap fasteners is believed to be in the order of $100 million annually in the United States, and to several times this figure worldwide, it being understood that these figures include cost of the products as well as leasing costs of the machines to assemble them. The major application is to apparel; other and lesser applications include footwear, tarpaulins, luggage, envelopes, and appliance and machine panels.

BRIEF STATEMENT OF THE INVENTION

It is an object of the invention to provide an improved method and means for attaching a functional device, such as a snap fastener, to a substrate such as a fabric material, avoiding most of the operational and material elements of cost and complexity which characterize present practice.

Another specific object is to provide a method and means for in situ forming and attachment of a snap fastener or other functional device to a substrate.

Another specific object is to provide an improved method of attaching a device of the character indicated to a substrate with greater anchoring effectiveness than heretofore, in the sense that anchoring effectiveness is distributed on a substrate-area and volumetric basis and is thus less likely to induce tearing or other degradation of the substrate to which it is attached.

It is also a specific object to meet the above objects without requiring prefabrication of parts and wherein, in the case of snap fasteners, the option is available to make the attachment with little or no externally visible indication of the fact of attachment.

A further specific object is to meet the above objects with a method which lends itself to simple and rapid changeover, from one functional-device attachment style and/or size, to another.

A general object is to meet the above objects as to snap fasteners, while also substantially reducing cost, and improving quality and reliability of the finished product and its attachment to the substrate.

The invention in a preferred embodiment achieves the foregoing objects by in situ plastic molding of a functional device while also attaching the same by local impregnation of porous substrate material. More specifically, a measured quantity of plastic material, such as a plastic pellet, is of such volume as to accommodate (1) compressional impregnation of the full thickness of the substrate, from one side of the substrate and against a reacting anvil (or die) at the opposite side, and (2) die-forming of the functional device at said one side, once the impregnation is complete. Compressive liquifying energy is imparted to the plastic by ultrasonic modulation of continuous displacing force applied normal to the substrate and to the anvil, and both the impregnation and the die-forming phases of the process are accomplished in a single-stroke cycle of the displacing force.

DETAILED DESCRIPTION

The invention will be described in detail, in conjunction with the accompanying drawings, in which.

Figure 2A:
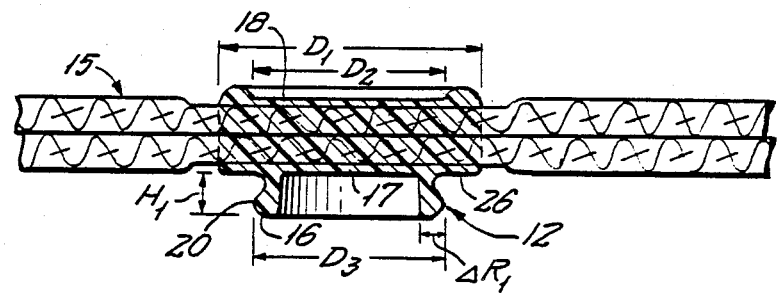
FIG. 2A is an enlarged sectional view of the stud formation of one part of a snap-fastener embodiment of the invention.
Figure 2B:
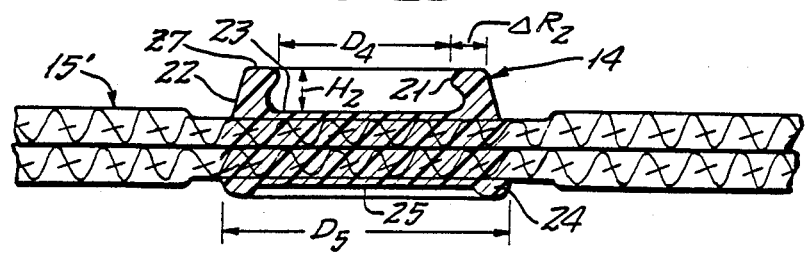
FIG. 2B is a view similar to FIG. 2A for the coacting socket formation of the other part of the same snap-fastener embodiment of the invention.
Figure 2C:
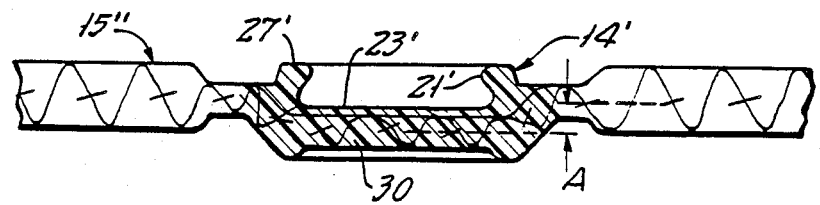
FIG. 2C is a view similar to FIG. 2B to show an alternative socket formation having snap-engageability to the formation of FIG. 2A.
Figure 8:
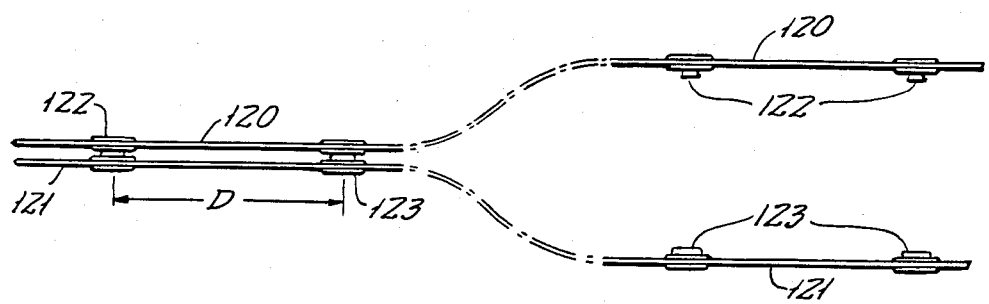
Figures 5, 5A:
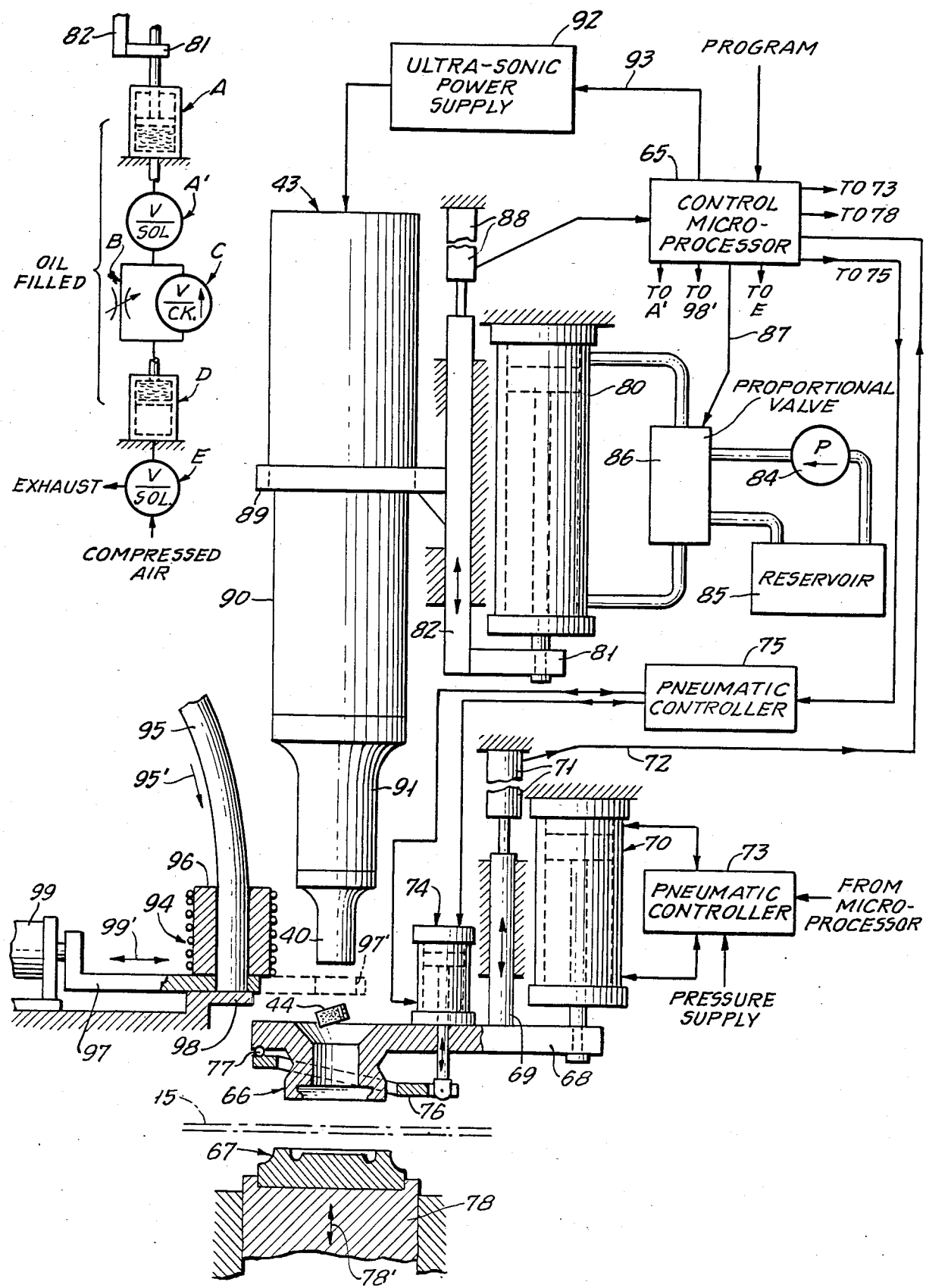
Figure 7:
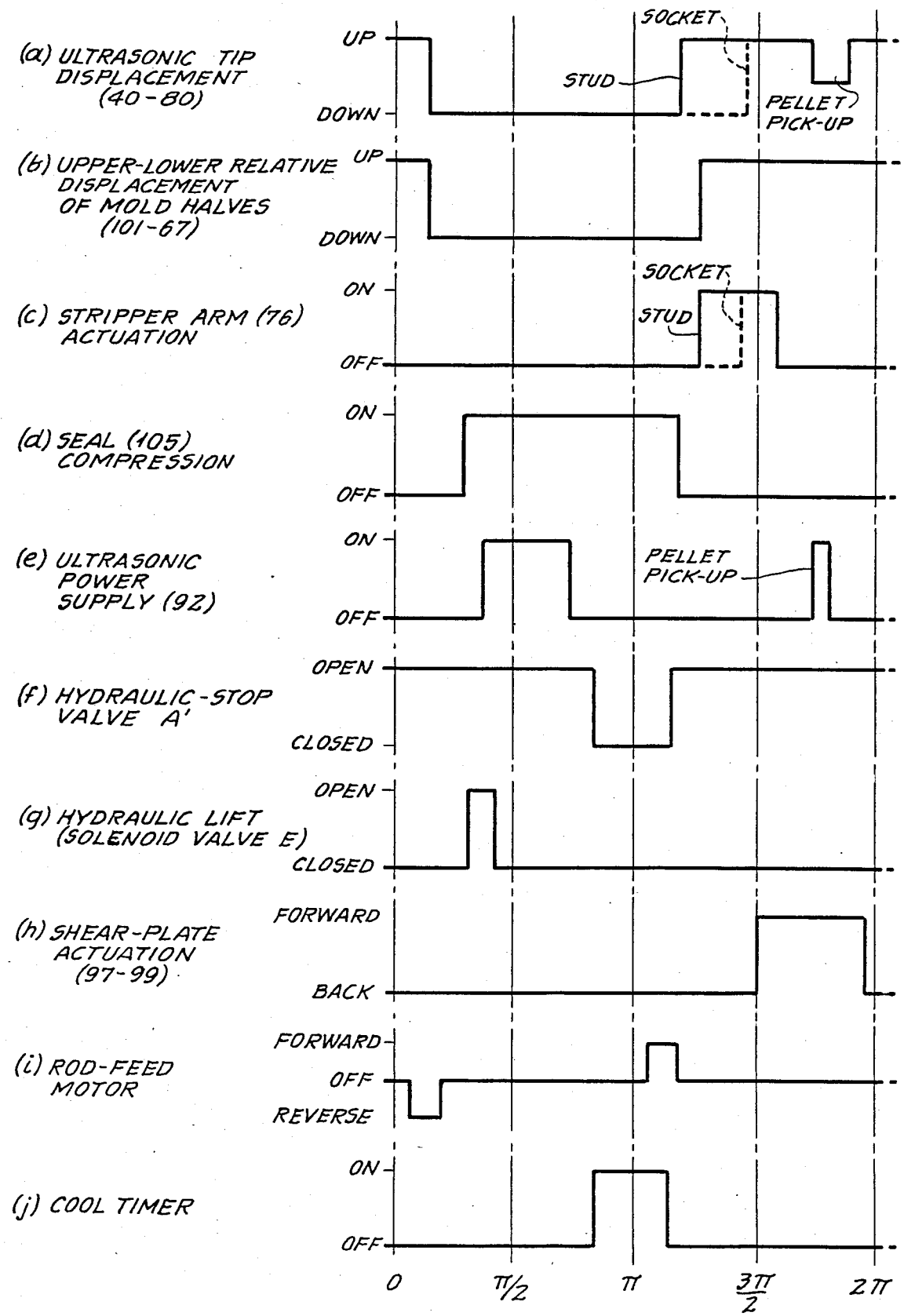

FIGS. 4A, 4B, 4C, and 4D are simplified alternative die relationships for performing the method of the invention;

FIG. 5 is a simplified diagram to illustrate cooperating elements of a machine for in situ manufacture of stud and socket formations as in FIGS. 2A, 2B, 2C;

FIG. 5A is a schematic diagram of a velocity-control and tip-elevating detail applicable to the machine of FIG. 5;

FIGS. 6A, 6B, 6C, 6D, 6E and 6F are successive vertical sectional views to illustrate the sequence of events in formation of stud and socket parts with the machine of FIG. 5;

FIG. 7 is a multi-level diagram to illustrate coordination of various individual functions in a single cycle of operation of the machine of FIG. 5; and FIG. 8 is a simplified view in side elevation to show an article of manufacture embodying the invention.

Figure 1:
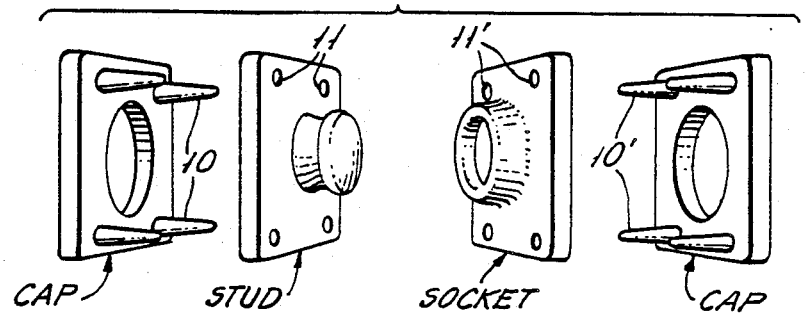
FIG. 1 is an exploded perspective view of the four separate component parts of a representative prior-art snap-fastener set, wherein each of the parts is captioned, and stud-related parts are in opposed-perspective relation to socket-related parts.

It has been explained above that the four separately manufactured and labeled component parts of FIG. 1 are representative of prior art practice in respect to snap-fasteners. The showing happens to be for a plastic injection-molded variety in which the multiple prongs 10 of a first cap part must pierce a substrate such as garment fabric before entry into, passage through and deformed clamping over registering apertures 11 in the base of a stud part. Similarly, the prongs 10' of a second cap part must pierce another substrate area before entry into, passage through and deformed clamping over registering apertures 11' in the base of a socket part. The two thus-equipped substrate areas are then separably securable by snap action via stud entry into and removal from the socket, relying upon transient locally compliant deformation of one or both of the stud and socket formations.

In contrast to the prior art, FIGS. 2A and 2B respectively show a stud formation 12 and a cooperable socket formation 14, both according to the invention. The stud formation 12 is of suitable plastic material, molded in situ to and through an intervening porous substrate 15, which happens to be shown as a fabric, folded over to be double thickness at integration with stud formation 12; the socket formation 14 is similarly assembled to a porous substrate 15'.

The technique of forming at 12 will be later described, but it suffices for present purposes to state that the main body of formation 12 is that region which lies within an outer diameter $D_1$ and in which the plastic material of formation 12 has fully impregnated all voids of the substrate and has become a solid integrated component of the substrate. The stud itself is shown as a relatively thin stubby annulus 16, rising to an extent $H_1$ above a relatively thin base plastic layer 17 which locally covers the substrate face to which stud 16 is applied. At the other face of the substrate, a similar relatively thin base layer 18 of plastic covers the substrate but in the form shown is peripherally integrated with and reinforced by a shallow circumferentially continuous and rounded outer rim 19, of inner diameter $D_2$.

The stud annulus 16 is characterized by a circumferentially continuous convex bulbous and bead-like outer contour 20, and its radial thickness $\Delta R_1$, in the context of elastic properties of the involved plastic material, is such as to provide the stud annulus 16 with a degree of relatively stiffly but smoothly compliant local deformability, in the course of snap-on/snap-off transient interference coaction with the socket formation 14 of FIG. 2B. For such coaction purposes, the outer diameter $D_3$ of the stud annulus 16 exceeds the throat diameter $D_4$ of the radially inward bead-like contour 21 of a relatively thin stubby annulus 22 of the socket part 14; this annulus 22 rises to the extent $H_2$ above a relatively thin base layer 23 of plastic locally covering the substrate face to which socket 14 is applied.

Preferably, $H_1$ is equal to or slightly less than $H_2$ so that, when stud 12 is engaged to socket 14, a flat flange-like surface 26 ringing the base of the stud annulus 20 will have circumferentially continuous compliantly clamped seating engagement with a flat land surface 27 which is the upper limit of the socket formation 14. Preferably also, the effective radial thickness $\Delta R_2$ of the socket annulus 22 is such, in the context of the involved plastic material, that a degree of stiffly compliant deformability is realized in the course of snap-on/snap-off coaction with the stud formation 12 of FIG. 2A.

As in the case of stud (12) integration with substrate 15, socket 14 is integrated by solid impregnation through all pores of the substrate 15', within an outer diameter $D_5$, which is comparable with outer diameter $D_1$ of the stud formation. And a circumferentially continuous and rounded outer rim 24 rings the thin base layer 25 which locally covers substrate 15' within rim 24. Marginally compressed substrate material, peripherally surrounding each visible part of each plastic formation 12-14, will be understood as a schematic suggestion of the compressive action of clamped opposing dies used in the in situ molding process, as will be made more clear.

For most purposes, snap-on/snap-off coaction between the stud-characterized substrate 15 and the socket-characterized substrate 15' will be perfectly satisfactory, especially if the substrate is a garment fabric and therefore relatively soft and compressible; in that event, the snap-fastener fabrics 15-15' will be in gap-free adjacency. However, if a more closely adjacent relation is desired, FIG. 2C illustrates, for a sufficiently soft and pliable substrate 15", that a socket formation 14' may be the product of having locally offset and compressed the substrate material in the course of the in situ molding process. Thus, in FIG. 2C, the substrate is locally compressed at 30 to a thickness which is about half normal thickness, and the center of the locally compressed region 30 is also consolidated by plastic impregnation into an axially depressed offset A from the central plane of symmetry of unimpregnated regions of substrate 15". The socket annulus, throat contour and like dimensions and relationships in the socket formation 14' may be as described for FIG. 2B and therefore the same reference numerals have been adopted, with primed notation, for corresponding features.

It will be clear, by inspection of FIGS. 2A and 2C, that upon snap-in engagement of stud formation 12 to socket formation 14', the flange region 26 of formation 12 will develop a circumferentially continuous seating relation with the mating land surface 27' of socket formation 14', and that upon this occurrence, adjacent surfaces of the snap-fastened substrates 15-15" will be mutually engaged, and free of any gap.

Figure 3A:
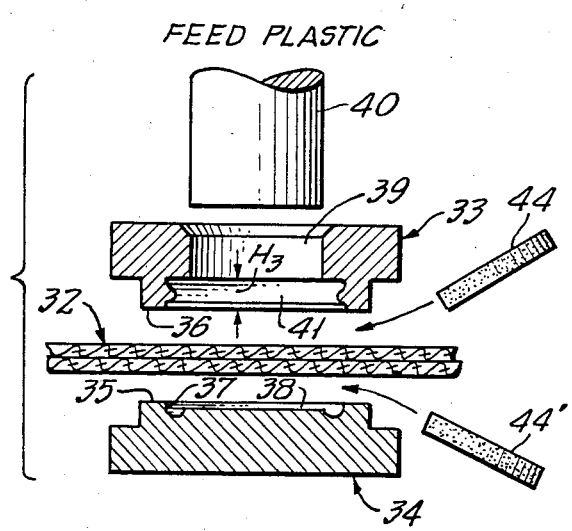
FIGS. 3A to 3G are successive simplified vertical sectional views to illustrate a typical sequence of events in formation of the parts of FIGS. 2A and 2B.
Figure 3B:
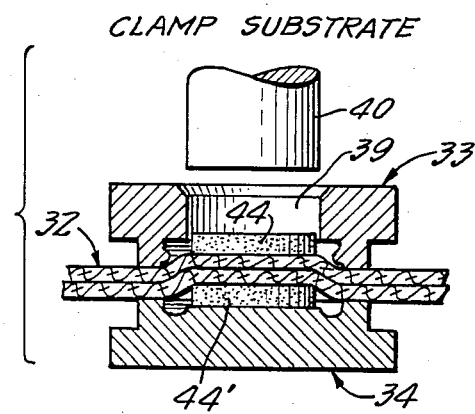
Figure 3C:
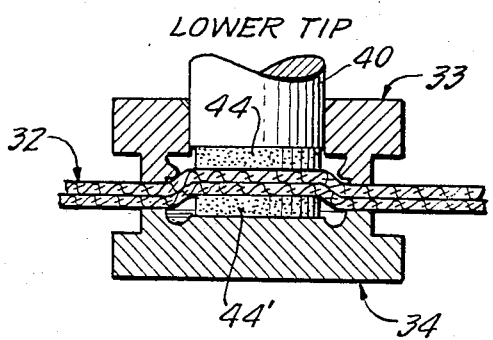

FIGS. 3A to 3F provide simplified illustration of successive steps in the in situ formation of a stud (FIG. 3F) in integrally united relation to a two-ply substrate 32. As seen in FIG. 3A, coacting upper and lower dies 33-34 are in separated but vertically aligned relation, to allow for insertion and correct relative placement of the substrate material 32. The lower die 34 is characterized by an annular clamping land 35, in vertically matching registration with a similar land 36 on the characterized lower face of the upper die 33. Concentrically within land 35, lower die 35 is characterized with a circumferential rim-defining concavity 37, surrounding a depressed flat 38. The upper die 33 has a central bore 39 sized and adapted for sealed reception and guidance of a ram 40; and, within the clamping land 36, a generally cylindrical cavity of depth $H_3$ has a circumferentially continuous side wall 41 of undulating section designed to produce the bulbous convex contour of the ultimately formed stud.

Having thus identified coacting features of the mold, it will be observed that ram 40 is the cylindrical lower or tip end of an ultrasonic converter 43, to be more fully described in connection with the machine of FIG. 5; as will also become more clear in connection with FIG. 5, the tip 40 is subjected by the machine to controlled vertical displacement and, when subjected to ultrasonic excitation, the lower face of tip 40 is axially oscillated, to impart relatively small-amplitude piston-driving impact on such material as it may contact. The key material exposed to ultrasonic action is a precisely measured quantity of suitable plastic, which may be a single pellet 44 positioned on substrate 32 and coaxial with the central axis of dies 33-34 and of tip 40; alternatively, an additional precisely measured pellet 44' may be similarly positioned on flat 38, beneath substrate 32.

As shown, pellet 44 (44') diameter is less than bore diameter at 39, thereby assuring clean entry of pellet 44 into bore 39 at the time (FIG. 3B) when dies 33-34 are displaced into clamped position, wherein the matching lands 35-36 squeeze the substrate 32 to thereby limit the perimeter within which substrate pores are available for impregnation. In FIG. 3, it will be seen that the presence of lower pellet 44', in the context of a sufficiently flexible substrate 32, has upwardly displaced the upper pellet into partial reception within bore 39, all in readiness for the next step (FIG. 3C) wherein tip 40 is downwardly displaced into pellet (44) contact.

Figure 3D:
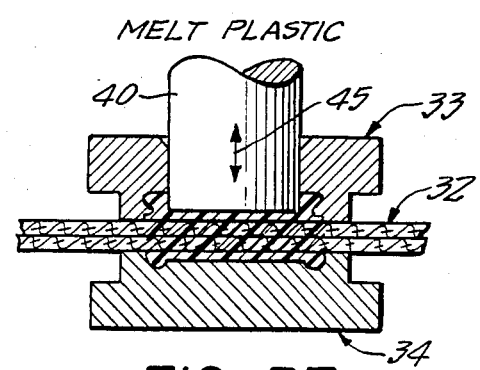

At or before pellet (44) contact, the ultrasonic converter 43 is activated to induce the lower face of tip 40 into short-amplitude piston-like reciprocation at ultrasonic frequency, as piston 40 continues its overall descent to a limiting position (FIG. 3D) wherein not only have all voids, pores and interstices of the substrate been filled but so also have all die-shaping surfaces been pressurized with pellet plastic which has been liquified by the heat of particle-to-particle friction resulting from ultrasonic piston action. In FIG. 3D, a double-headed arrow 45 will be understood to symbolize the vigorous action of short-stroke piston oscillation whereby the plastic is quickly heated to melting temperature so that substrate impregnation and mold filling can proceed to completion.

Figure 3E:
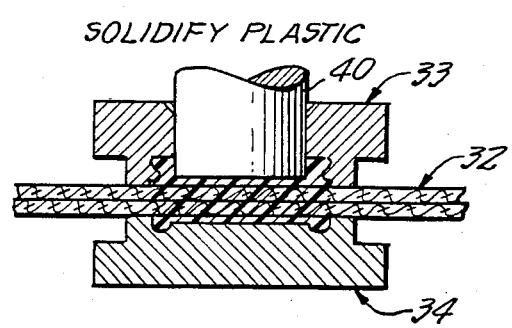
Figure 3F:
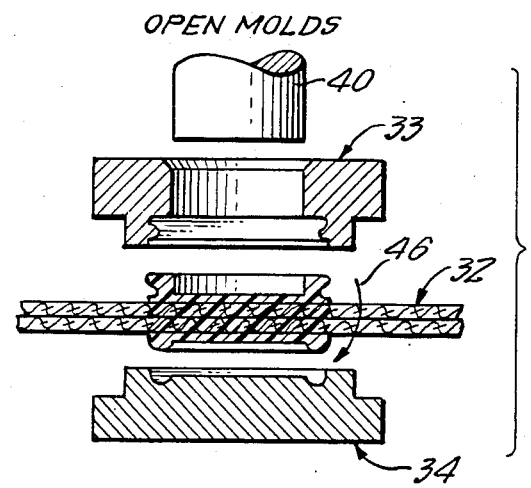

FIG. 3E is virtually identical to FIG. 3D, but it depicts a short static condition or dwell for heat dissipation through the conductive cooling capacity of die members 33-34 and tip 40, thus allowing the molded plastic to solidify in its substrate-impregnated and mold-filling shape. Finally, FIG. 3F depicts the opening of molding dies, retraction of tip 40, and the stripping of the upper molding die 33 from the bulbous formation of the newly created stud formation. In stripping, it is advisable first to effect total withdrawal of tip 40 from the mold bore 39, and then to drop the lower mold half 34, prior to performance of the stripping operation by an angular tipping of the molded region with respect to mold die 33; an arcuate arrow 46 will be understood to suggest such tipping.

Figure 3G:
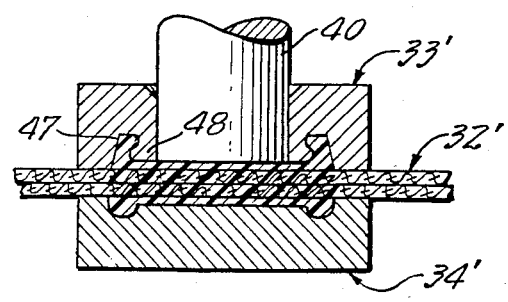

FIG. 3G corresponds to FIG. 3E, in the sense that it shows a molded socket part, like the part 14 of FIG. 2B, just prior to retraction of tip 40 and downward separation of the lower mold half 34', thereby permitting the fabric 32' with its integrally molded socket part to be angularly tilted (as at 46 in FIG. 3F) in stripping the same from the upper mold half 33'. It will be noted that stripping is facilitated (1) by inherent compliant deformability of the molded-plastic material and (2) by the inwardly tapered slope of the upper-mold wall 47 which defines the outer surface of the molded-socket formation, it being further noted that the upper-mold half 33' provides a continuous cylindrical bore for accommodation of tip 40, all the way to its downward extreme position (as shown in FIG. 3G) and that a depending annulus 48 within the upper-mold cavity is relied upon to define the throat contour of the socket-part opening.

In the discussion thus far, it has been presumed that the "cap" side of a given in-situ molding to substrate shall be a rounded bead or ridge surrounding a thin flat covering of the involved face of the substrate. But this is by no means a requirement, as examination of the stud formations of FIGS. 4A to 4D will reveal, it being understood that features of these different alternatives are also applicable as features of corresponding socket-formation parts.

Figure 4A:
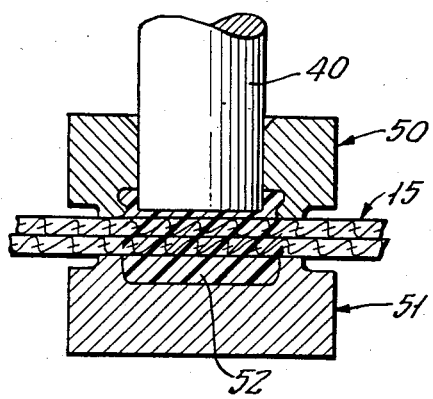

In FIG. 4A, the upper mold half 50 is essentially as described for mold half 33 in FIG. 3, but the lower mold half 51 has a cavity 52 of uniform depth, being characterized by a rounded peripheral edge and a flat bottom. The uniform depth will be understood to enable the otherwise flat bottom of the cavity to be decoratively or otherwise uniquely characterized for creation of an intaglio or relief design in the molded product, e.g., to make the face molded by bottom 52 appear with an initializing letter, a button design, or otherwise.

Figure 4C:
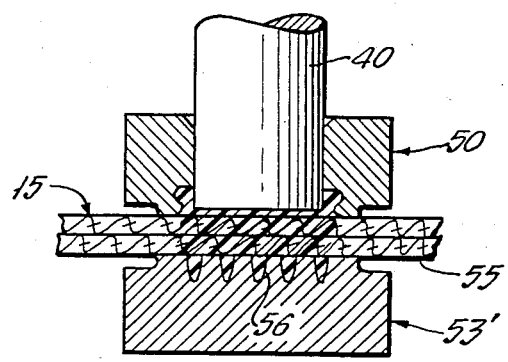
Figure 4B:
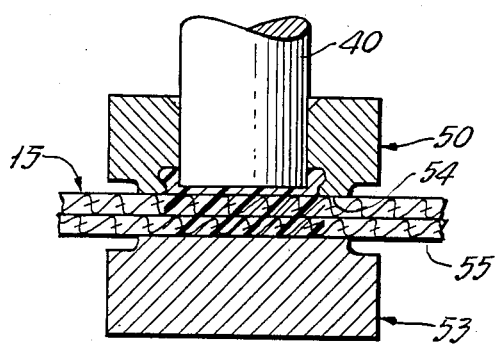

In FIG. 4B, the same upper mold half 50 is used in conjunction with a lower mold half 52 which presents a flat anvil-like upper face in total registration with the flat annular rim 54 of the upper mold half 50, whereby clamp action of mold halves 50-53 in squeezing compression of substrate 15 defines lateral confines of plastic impregnation of the substrate, with little or no plastic surface formation at anvil contact. Thus, if the color of the impregnating plastic is a substantial match of the color of the substrate, the plastic of the molded stud of FIG. 4B will be essentially unobservable at the exposed face 55 of the substrate.

In FIG. 4C, the same upper mold half 50 appears with a different anvil-like lower mold half 53', wherein the anvil face which confronts the face 55 of the substrate is characterized by a pattern of recesses 56. This may be a pattern of individual dome-forming recesses that are spaced over the area confined by annular clamping of the substrate. Alternatively, the plural recess sections shown in FIG. 4C may represent plural ring-forming recesses that are concentric about a central dome-forming recess 56. The result in the molded product is an illustrative local decorative appearance on the face side 55 of the substrate.

Figure 4D:
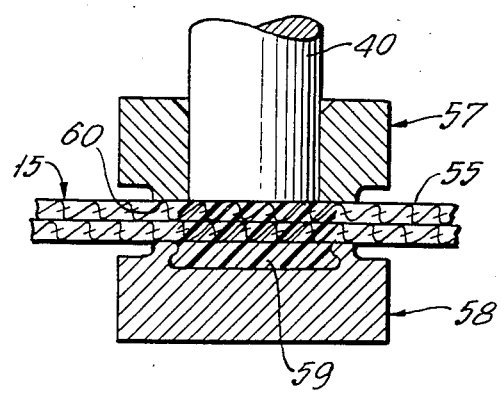

FIG. 4D is illustrative of the fact that the fastener-side of the molded product does not necessarily have to be on the side from which the ram and ultrasonic action of tip 40 are applied. Thus, in FIG. 4D, tip 40 and its associated upper mold half 57 are applied to the face side 55 of the substrate, and the lower mold half is characterized by a stud-defining cavity 59. In the process of making a molded product, a suitably sized and measured plastic pellet, applied to the substrate face, prior to mold closure, and prior to descent of tip 40, can serve both for substrate impregnation and for lower-mold filling; alternatively, upper and lower measured plastic charges may be inserted, as in the case of FIG. 3A. The product may be completed by so premeasuring the plastic charge that when tip 40 is flush with the clamp land 60, all accessible substrate voids have been filled, and so also has the lower-mold cavity 59, under requisite pressure for forming and initial-curing purposes; alternatively, with a slightly shorter measure of plastic, the substrate face 55, at the stud formation, will be a slightly indented circular area, formed by tip 40. Still further alternatively, with a slightly greater measure of plastic, the substrate face 55, at the stud formation, will be a slightly raised or thickened circular coverage of the substrate face, the same being attributable to the bore diameter of mold half 57.

FIG. 5 schematically shows functional components of a machine for producing in-situ molded functional devices of the above-described character, under control of a suitably programmed microprocessor 65. The machine will be understood to include means (not shown) for properly orienting and positioning substrate material 15 between upper and lower mold halves 66-67, which are shown to have molding-cavity shapes generally as described for die parts 33-34 of FIGS. 3A to 3E. The upper mold half 66 may be a selectively removable fitting to a bracket 68 but for simplicity is shown integrally formed therewith. Bracket 68 is part of a slide 69 which is guided for vertical reciprocation under displacement actuation by a double-acting pneumatic positioning cylinder 70. A sensor 71 electrically tracks the instantaneous position of bracket 68 (and therefore also of mold half 66) and transmits position data via a feedback line 72 to the control microprocessor 65. A pneumatic controller 73 operates from a suitable source of fluid pressure to determine the extent and direction of up/down displacement of upper die 66, via actuator 70; and an electrical control for this purpose will be understood to receive its control signals from an output connection to microprocessor 65, as suggested by the legend "To 73". In similar fashion, another microprocessor output carries the legend "To 75" to indicate similar double-acting displacement control (at 75) of a secondary double-acting pneumatic actuator 74, via a pneumatic controller 75; actuator 74 is mounted to bracket 68 and has up/down positioning control of a stripper arm 76 having hinge connection at 77 to bracket 68.

The lower die element 67 is shown to be replaceably mounted to a supporting member 78 which is up/down displaceable in vertical guideways under actuating control which may be similar to that described for the upper-die actuator 70 and its controller 73. The double-headed arrow 78' will be understood to indicate such actuation and control, as determined by another microprocessor output, labeled "To 78".

Thus, when and as dictated by microprocessor sequencing, the respective die halves 66-67 may be driven into squeezing (clamping) contact with substrate, and retracted singly or in unison, as may be appropriate for the particular involved molding operation.

In similar fashion, but preferably under positioning control by a hydraulic system, a double-acting cylinder 80 has actuating connection 81 to a vertically guided slide 82 which mounts the ultrasonic converter 43. A motor-driven pump 84 draws hydraulic fluid from a reservoir 85 to supply a proportional valve 86 having connections to the respective ends of cylinder 80, and the magnitude and direction of resulting displacement of the ultrasonic converter 43 are subject to the electrical control dictates of microprocessor 65, via control connection 87, instantaneous position feedback being electrically provided to the microprocessor by a sensor 88 of slide (82) position. As shown, driver structure of the ultrasonic converter 43 is carried by a bracket component 89 of slide 82; from this point, booster (90), horn (91) and tip (40) components of the ultrasonic system are vertically suspended from the driver structure, and requisite power-supply energy is applied to the driver structure by suitable means 92 having a control connection 93 from microprocessor 65.

In the form shown, precisely measured pellets 44 of plastic to be molded are formed by a shear device 94 which accepts incremental feed of plastic rod 95 in the guide bore of a fixed block 96 having an electrical heater winding for initial softening of downwardly fed rod 95. A horizontally reciprocable shear plate 97 has a rod-receiving opening which, in the retracted position of plate 97, registers with the bottom or discharge end of the bore of block 96; in this position, the thickness of shear plate 97 determines the incremental length of rod 95 which can be fed (as suggested by an arrow 95'), to a fixed stop 98. And it will be understood that, at the proper instant in the cycle of machine operation, namely, when tip 40 is fully retracted and die parts 66–67 have closed or are in the process of closing on substrate 15, a double-acting pneumatic actuator 99 imparts horizontal displacement of plate 97, to the right, in the sense of FIG. 5, shearing off a new pellet 44 and transporting the same into registry (phantom outline 97') for gravitational release into the bore of the upper mold half 66; this is quickly followed by retraction of shear plate 97, to the position shown in solid outline, the reciprocation displacements being suggested by a double-headed arrow 99'. Again, it will be understood that the reciprocation of shear plate 97 may be under microprocessor control, and schematic indication of this fact is provided by a microprocessor output connection having the legend "To 99'". Similarly, the incremental feed of plastic rod 95 may also be under microprocessor control, but the arrow designated 95' will be understood to indicate positive feed, as by feed rolls (not shown) under the constant urging of a stalled-torque electric motor drive, the drive being effective to impart the incremental feeding advance of plastic rod only when shear slide 97 returns to its retracted position after having just dropped a freshly sheared pellet 44 into the bore of the upper mold half 66. Once the rod has been incrementally fed to stop 98, continued rod-feeding force will be understood to place the heating tip of the rod under such axial compression as to assure a clean shearing cut, perpendicular to the rod axis.

The schematic detail of FIG. 5A illustrates a velocity-control feature governing actuated descent of the tip 40 in the course of a molding process, as well as a transient tip-lifting feature to free tip 40 from pellet contact at the time of initiating its ultrasonic excitation. The arrangement is seen to comprise a rod connection from vertical-slide part 81 to a piston in a first fixedly mounted cylinder A. Rate-control hydraulic elements B-C and a solenoid valve A' are interposed between cylinder A and a second cylinder D, the latter having a "floating" piston to accommodate a changing volume of hydraulic fluid in its upper zone, against the reaction of a spring (not shown) and/or compressed air in its lower zone. The hydraulic part of this system additionally comprises the head-end zone of cylinder A, as well as solenoid valve A' and the rate-control elements B-C; these elements are shown as an adjustable orifice (B) and as a check valve (C), connected in parallel and oriented to govern (i) an adjustably "slow" rate of tip (40) descent in the course of a molding operation and (ii) an otherwise unrestrained retracting displacement of tip 40. The solenoid valve A' will be understood to be under control of microprocessor 65, based on displacement sensing at 71 and 88, and to be operative to establish a precisely determined fixed stop, against advance of tip 40 beyond its predetermined stop position. A further solenoid valve E will be understood to admit a transient supply of compressed-air to the lower zone of cylinder D, under timed control by microprocessor 65, as suggested by the legend "To E" in FIG. 5, all for a purpose to be explained in connection with FIGS. 6 and 7.

Having identified principal operating components of the machine of FIGS. 5 and 5A, a representative machine cycle of operation will be described, the same being under position-sensing, timing, and sequencing control by microprocessor 65. In this connection, the sequenced operation of a preferred mold and stripper will be described for successive sectional views of FIG. 6, taken with the diagram of FIG. 7, which depicts a full $2\pi$ cycle of the machine, in context of its $\pi/2$ quadrants.

Figure 6A:
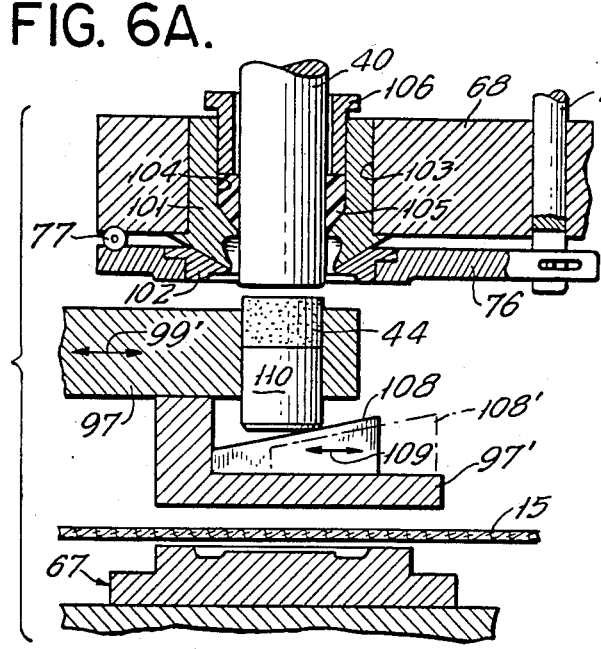
Figure 6D:
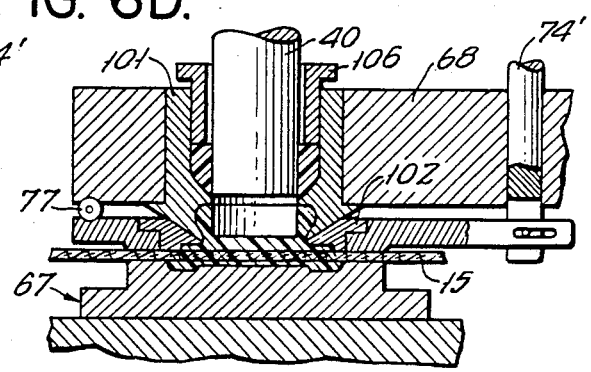
Figure 6B:
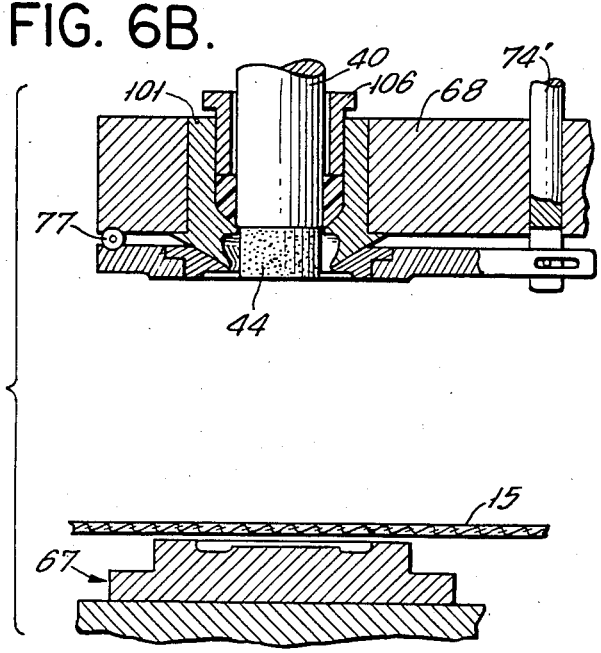
Figure 6E:
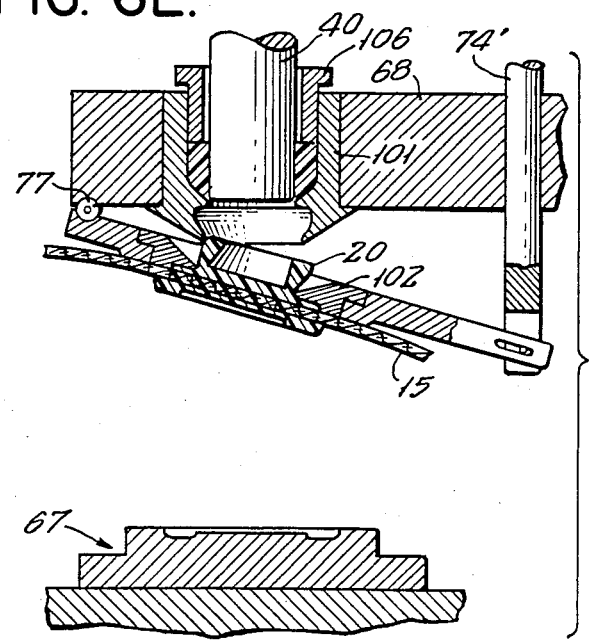

In the mold configuration of FIGS. 6A to 6E, stud-defining contours are the product of coacting cavities of two annular die elements 101, 102, the upper (101) of which is removably mounted to a bore 103 in bracket 68, and the lower (102) of which is a removably fitted part of the stripper arm 76. These die elements separably fit at frusto-conical interface between their respective convex and concave mating surfaces, when the stripper arm is in its normal raised (unactuated) position (FIGS. 6A to 6D). The parting line between cavities of die elements 101, 102 is such that the cavity of upper element 101 is responsible for the outer bulbous contour of a stud formation (as at 20 in FIG. 2A), and the cavity of lower element 102 is responsible for the flat flange (as at 26 in FIG. 2A) at the base of bulbous formation 20. Such a parting line is seen in FIG. 6E to enable stripper arm 76 to fully engage flange 26 when stripping the bulbous formation 20 (with transient compliant deformation, as shown) from the upper die element 101, it being understood that stripping of the molded stud from die element 102 involves similar transient compliant deformation of bulbous feature 20 as substrate 15 is pulled away, by means not shown.

Above its molding-cavity portion, the upper die element is characterized by a cylindrical guide bore 104 with a tapered lower end which terminates in close clearance relation with the outer cylindrical surface of ultrasonic tip 40. An elastomeric seal member 105, suitably of Teflon, is contoured to fit the lower end of guide bore 104; and a flanged bushing 106, guided by the upper end of bore 104 and in clearance with tip 40, will be understood to be a means of tightly sealing the upper-end closure of the mold, at fit to tip 40 while molding pressure is operative. Downward arrows 107 in FIG. 6C will be understood to suggest application of such pressure during the molding and curing phases of the process.

FIG. 6A further shows a presently preferred technique of pellet 44 delivery to the molding system, being shown at the instant at which a transversely shiftable wedge 108 on a part 97' of shear plate 97 has been actuated (by means suggested by double arrow 109) from its phantom position 108' to the position at which it has elevated a new pellet 44 slightly above the upper surface of the shear plate 97; this elevation was achieved via a stop pin 110 that tracks wedge 108 and is guided by the pellet bore of plate 97, it being understood that for the phantom position 108', pin 110 determines the vertical extent for sheared formation of pellet 44.

The sequence depicted in FIGS. 6A to 6E begins with FIG. 6A as an event in the fourth quadrant ($3\pi/2$ to $2\pi$) of FIG. 7, namely when a new pellet 44 has been shorn from rod 95 and has been advanced forward to registry beneath tip 40 (and slightly elevated toward tip 40). This shearplate event is depicted at curve (h) of FIG. 7 and is seen at curves (a) and (e) to lap a brief period of ultrasonic excitation and downward displacement of tip 40 into sufficiently tacky contact with the upper surface of pellet 44 to enable its retrieval from shear plate 97 and withdrawal into the upper mold-cavity region, as depicted in FIG. 6B for the end of the last quadrant of the cycle of FIG. 7; at this time, FIG. 6B also shows that the pellet-delivery system has been retracted, clear of all molding operations.

Figure 6C:
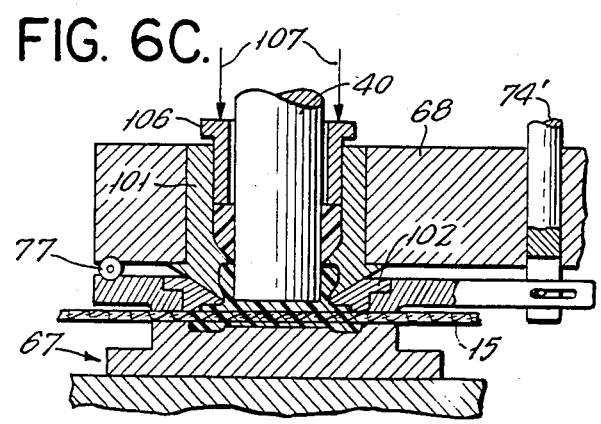

Having retracted the pellet-delivery system, the mold halves may be closed to squeeze against opposite sides of the substrate 15, thus defining the enclosed volume within which die-forming is to proceed; FIG. 6C shows this relationship in the further context of applying pressure (107) to the seal closure 105 while tip 40 is advanced in the molding and curing process. More specifically, the curves (a) and (b) of FIG. 7 show concurrent timing of tip (40) advance and mold-half clamping forces, extending for approximately half the total cycle, and lapping the first, second and third quadrants of the cycle. In response to these displacement forces, tip 40 is restrained in its advance, by reason of the adjustment at orifice B (FIG. 5A). However, once the mold halves have clamped to squeeze the substrate, and just prior to supplying ultrasonic power to the driver 43 of tip 40 (see curve (e) of FIG. 7), seal 105 is subjected to compressional force (see curve (d) of FIG. 7); and solenoid valve E is briefly opened for such transient lifting of tip 40 as to strip pellet 40 from its tack engagement to tip 40, thereby affording maximum opportunity for prompt establishment of the ultrasonic-piston mode of tip 40 action. Thus, at the instant when controlled descent brings tip 40 into pellet-engaged action against the substrate, tip 40 is in full ultrasonic axial-displacement oscillation; and the sonic-melting, substrate-impregnation and mold-filling phase proceeds in the further course of the adjustably controlled descent of tip 40. This descent abruptly ceases when microprocessor 65 ascertains, from its tracking of position sensors 71-88, that the predetermined limiting advance of tip 40 has been achieved, thereby activating the hydraulic-stop solenoid valve A' of FIG. 5A; as can be seen from curves (f) and (e) of FIG. 7, this abrupt stop occurs after cut-off of ultrasonic power for a brief instant to permit tip 40 to exert pure (unmodulated) axial force while consolidating the filled condition of the mold and of the substrate region within the perimeter of mold-clamp action.

Curve (j) of FIG. 7 illustrates timing for cooling means (not otherwise shown) which is operative upon die and/or tip (40) elements, should the materials and molded-article size require cooling, in aid of curing, and for reduction of overall cycle time; normally, however, special cooling provision is not needed, because tip 40 and its massive suspension provide a good heat sink. Once curing has sufficiently advanced, with or without special cooling, seal (105) compression is relaxed (curve (d)) and the hydraulic-stop valve A' is opened, to allow the mold-opening and tip-retraction strokes indicated for curves (b) and (a) of FIG. 7. FIG. 6D illustrates that retraction of tip 40 precedes mold-opening. And FIG. 6E illustrates stripper-arm actuation, which, for the case of stud molding may be coincident with mold-opening, and which for the case of socket molding (see dashed lines indicated by legend in curves (a) and (c) of FIG. 7) is preferably after mold-opening, for a reason to be explained in connection with FIG. 6F.

Remaining curve (i) of FIG. 7 will be seen to apply for timing of rod-feeding means which relies upon the stalled-torque motor drive referred to in connection with reference numeral 95' of FIG. 5. In this curve (i) alternative, the feed means is operative to maintain stalled-torque force application to the rod while a pellet is sheared; thereafter, at the beginning of the third quadrant of the cycle, the stalled-torque motor is reversed to retract the end of the rod for momentary reheating within the heated device 94.

Figure 6F:
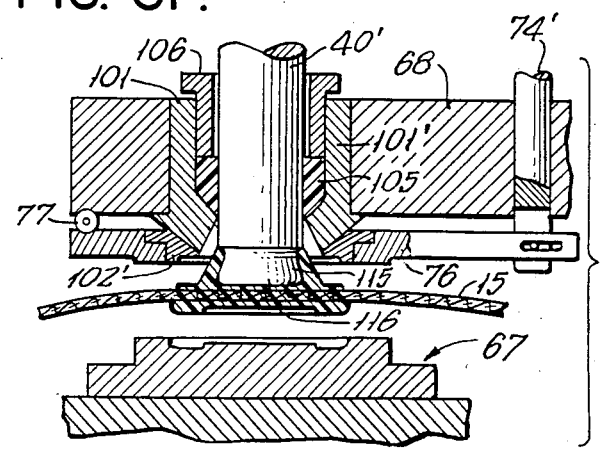

FIG. 6F is illustrative of the two-part upper-mold concept in application to the molding of a socket part 115 to substrate 15. The driving end of tip 40 is characterized by a necked and bulbous formation which accounts for the inner contour of the molded part 115, and, for ease of stripping, the lower end of the bore of upper-die element 101' is flared outward. The dashed-line portions of curves (a) and (c), in the context of the mold-opening even of curve (b) of FIG. 7, show preference for opening the mold halves so that tip 40' will drive the molded product clear of the flared portion of upper-die element 101' (see FIG. 6F) before stripper arm 76 (curve (c)) is actuated, to part the product from tip 40'. Thereafter, as shown by the dashed line of curve (a), tip 40' is returned to its retracted position.

In discussion above, ultrasonic action on pellet plastic has been described as liquification by the heat of particle-to-particle friction resulting from ultrasonic piston action. This is undoubtedly true and is sometimes referred to as "internal hysteresis", but my observations to date suggest that the pellet melts progressively, from the substrate up, in that initial pellet engagement with the substrate comprises many point contacts, each of which is a small-area of energy focus, for local initiation of melting.

Having described several embodiments for different facets of my invention, it is helpful to enumerate certain observations, based on experimental use of the invention to date:

1. The resin used for pellet 44 is presently preferred to be supplied in solid unit form, as described for rod 95, in order to achieve maximum product quality and minimum cycle time. Powders or granuals melt erratically, and their volume is difficult to control. The most generic form of solid resin is extruded rod, which can be cut into preforms or pellets.

2. An accurate pellet can be sheared from rod material, when:
(a) The bores of the shear (97) and guide die (94) are close-fitting to the rod diameter;
(b) The rod is heated to or slightly below its softening point; and
(c) A moderate axial force is imparted to the rod, against the feed stop (98, 110), while shearing.

3. The amount of resin, e.g., height of the pellet (44) is critical and must be accurately controlled. This value must be matched to the type of substrate, thickness, number of substrate layers, type of fastener, and resin type.

4. The pellet (44) must be centered, i.e., on the same axis as the tip (40), to achieve uniform melting.

5. The pellet diameter should not exceed the tip diameter, and it is preferably less than the tip diameter. Any overhang of the pellet outside the contact circle of the tip (40) will result in incomplete melting.

6. Penetration velocity of the tip (40) must be controlled. Too high a value causes flash and poor adhesion to the substrate. Too low a value affects integrity of the substrate and burns the resin. Ideally, a variable profile of velocity is desirable in the course of a given stroke, starting relatively high and ending relatively low as the mold fills.

7. The amplitude of ultrasonic oscillation somewhat critical. Large values provide good adhesion but can cause burning; too low a value results in poor adhesion. A profile that starts high and ends low is ideal, in the course of the period of application shown at curve (e) of FIG. 7, and lapping the first and second quadrants of the cycle.

8. Initial pellet height is critical. Too tall a pellet causes poor adhesion, but enables provision of desirable aesthetics on the non-functional side; too short a pellet allows the tip (40) to come too close to the substrate, causing damage.

9. A small amount of tip overtravel, after sonic action ceases, is desirable. This "packs" the mold and prevents flash past the seal (105).

10. A definite stop (A, A'), to halt tip (40) against further advance, is essential for a quality product.

11. The resilient seal (105) must be able to withstand oscillation of the tip (40). To my knowledge, the best material is Teflon, which can have tight squeezing engagement around the tip (40), without damage.

12. Seal life can be enhanced by (a) squeezing the seal only while melting the resin, (b) never allowing the tip to leave the seal (thus avoiding reentry problems), and (c) highly polishing the tip surfaces.

13. If a decorative design or cap is desired on the non-functional side of the molded product, the anvil must provide distributed support of the substrate, as is provided by anvil 53' of FIG. 4C.

14. The type of resin used is not critical. Crystalline materials, such as acetol or nylon, tend to flash more readily becuase they exhibit a sharp melt point. Amorphous materials do not flash as readily but do require more energy to flow and to impregnate the substrate.

15. Resin alloys work well. The ultra sonic action causes violent mixing and produces homogeneous material. This fact enables use of scrap which contains several different base materials.

16. Typical cycle times are:
a. Melt time: 0.20 to 0.50 second.
b. Cool time: 0.50 to 1.50 seconds.

The described invention will be seen to achieve all stated objectives and to provide advantages over existing technology, including:

1. Simultaneous creation and attachment of functional parts to substrates by melting plastic resins.

2. Use and application of ultrasonic energy to provide both the thermal action and as a mechanical aid to mold-filling.

3. Total elimination of any need for discrete parts that must be prefabricated and then attached.

4. Preservation of substrate integrity during attachment.

5. Superior and very secure attachment of the formed part to the substrate, the impregnated region of the substrate becoming a significant integrally formed structural component.

6. The option of making an attachment that is virtually invisible at the non-functional face of the substrate.

7. The ability to rotationally and consistently orient any design or appearance feature on the nonfunctional side of the substrate, by virtue of the fixed orientation of the tooling.

8. The relatively short interval of time for a full cycle (FIG. 7) needed to melt, form and attach a part to substrate material.

9. The relatively simple and ready convertability of the process to different sizes, styles and types of parts and geometries.

10. Significantly reduced cost to manufacture an attached part, as compared to discrete parts that must be manufactured separately.

11. The ability to attach to virtually any substrate that is porous or will weld to the resin.

12. The ability to employ any from a wide range of thermoplastics offering a variety of properties.

13. Extremely short residence time of resin at molten temperatures, thus avoiding thermal degradation.

14. Elimination of runner systems normally required in the molding of plastic parts, thus avoiding scrap production and recycling of regrind.

15. Total impregnating saturation of a porous substrate with the resin.

16. Ability to force resin through a porous substrate for mold-filling on both sides of the substrate.

17. Ability to sense the current position of the tip (40) with respect to the upper mold, and to use the sensed information for precise cut-off of ultrasonic-energy supply.

18. Applicability of the process to full automation, with programmed in-line indexing of substrate material between successive molding cycles.

19. Ability to accommodate a variety of substrate materials, of different thickness and in single or multiple ply.

20. The ability to use filler materials and/or reinforcing fibers (e.g., glass-fiber flock) with the resin, to produce strong heat-resistant parts.

21. Relative insensitivity, allowing wide ranges in pressure, resin quantity and substrate variations.

22. Repeatability of the process, resulting in exact duplication of successively made parts attached to substrates.

23. Ability to strip finished product from the molds, in spite of undercut mold formations.

24. The ability to mold unusual variations of common articles and to attach the same to substrates in oriented fashion, for example snap fasteners of square, triangular or oval appearance.

25. The ability to readily vary snap action in snap fasteners by changing mold and/or tip elements.

26. The ability to use generic extruded rod as the resin sources, thus employing an economical, readily available material, and enabling a compact and clean delivery system.

27. Inherent adaptability to use of cold molds, thus enabling short cycle times and virtually instantaneous melting of the preform (pellet) within the mold.

While the invention has been shown and described for various embodiments, it will be appreciated that the invention may be modified and extended to other embodiments without departing from the scope of the invention. For example, and as illustrated by FIG. 8, the invention lends itself to a specialized subassembly, involving separate elongate substrate tapes 120-121 of flexible porous (e.g., woven) material, to which snap-fastener components have been molded. As shown, the snap-fastener components 122 in distributed array at spacings D along tape 120 are of stud variety, and the snap-fastener components 123 in similarly spaced array along tape 121 are of socket variety. The two tapes are salable in snap-fastened array, but are separable, as for sewing as appropriate to garment parts which are to be separably fastenable.

What is claimed is:

1. The method of precision-forming a fastener at a predetermined location on one side of a sheet of porous substrate material, wherein the fastener is one part of a two-part fastenable combination, which method comprises applying a premeasured quantity of plastic working material to said one side at said location, establishng an enclosed volume adjacent to and surrounding said location and said plastic working material on said one side, said enclosed volume being completed by circumferentially continous annular sealing compression of said substrate material against a reaction anvil on the other side of said substrate material, then compressionally deforming the premeasured working material against said one surface and against anvil reaction by direct vibratory excitation of the working material to melt the same and force its impregnation of substrate pores within the compressionally sealed annulus, the premeasured quantity of working material being greater than that required for such porous impregnation, whereby excess plastic working material remains at said one surface after local porous impregnation of the substrate, and die-forming the fastener from excess plastic material within the enclosed volume.

2. The method of using a cylinrdical ram to precision-form an outwardly open cupped fastener at a predetermined location on one side of a sheet of porous substrate material, which method comprises applying a premeasured quantity of plastic working material to said one side at said location, establishing an enclosed volume adjacent to and surrounding said location and said plastic working material on said one side, said enclosed volume being completed in part (a) by circumferentially continuous annular sealing compression of said substrate material against a reaction anvil on the other side of said substrate material, the sealed annulus defining an inner uncompressed area of substrate material exceeding the sectional area of the ram, said enclosed volume being further completed (b) by circumferentially continuously sealed sliding engagement to the cylindrical surface of the ram on an axis normal to the substrate material at said location, then compressionally defomring the premeasured working material aganist said one surface and against anvil reaction by direct vibratory driven contact of the inner end of the ram with the working material to melt the same and force its impregnation of substrate pores within the compressionally sealed annulus, the premeasured quantity of working material being greater than that required for such porous impregnation, whereby excess plastic working material remains at said one surface after local porous impregnation of the substrate, and die-forming the fastner from excess plastic material within the enclosed volume by inwardly displacing and vibrationally driving the ram to the extend achieving an outward dispalcement of working material into circumferentially continuous axial overlap of the inner end of the ram.

3. The method of claim 1 or claim 2, in which the fastener is a snap-fastener stud.

4. The method of claim 1 or claim 2, in which the fastener is a snap-fastener socket.

5. The method of claim 1 or claim 2, in which the compressive deformation is by ultrasonic modulation of a continuous force applied normal to the substrate and to the anvil.

6. The method of claim 1, in which said fastener is characterized by a central bore in a generally cylindrical annulus upstanding from the porous impregnation, in which a compression applicator is selected for local generally cylindrical definition of the profile of said bore, and in which an annulur forming die is selected for definition of said generally cylindrical annulus in conjunction with displacement of said applicator within said forming die.

7. The method of claim 1, in which the compression applicator is selected for a circumferentially continuous convex bulbous tip-end contour, for socket-bore definition of said complimentary.

8. The method of claim 5, in which the ultrasonic modulation is terminated prior to termination of the applied continuous force.

9. The method of claim 1 or claim 2, in which said premeasured quantity is the product of shearing a predetermined length of plastic rod, said shearing being in an automated cycle synchronized with an automated cycle of compression-deformation and die-forming.

10. The method of claim 9, in which the plastic rod is preheated to softening temperature immediately prior to shearing.

11. The method of claim 1 or claim 2, in which the porous impregnation and the die-forming of excess plastic material are accomplished in the course of a single and continuous application of compressive energy.

12. The method of claim 1 or claim 2, in which the porous substrate material is a fabric.

13. The method of claim 1 or claim 2, in which the porous substrate is a woven fabric.

14. The method of claim 1 or claim 2, in which the porous substrate material is a tape, and in which the formed fastener is one of a plurality in similarly formed and spaced array along the tape.

15. The method of claim 1 or claim 2, in whch the reaction anvil is selected for flat-surface application to the opposite surface of the substrate material, whereby the product of the method is characterized by a consolidated impregnation which terminates flush with the opposite surface of the substrate.

16. The method of claim 1 or claim 2, in which the reaction anvil is selected for flat-surface peripherally continuous application to the opposite surface of the substrate and in which, within the flat-surfaced periphery, the anvil has a cavity, whereby to form at the opposite surface at least a raised shape conforming to the cavity and integrally consolidated with the impregnation and with the formed fastener.

17. The method of claim 1 or claim 2, in which the reaction anvil is selected for peripherally continuous land application to the opposite surface of the substrate, and in which plural spaced fasteners are sequentially formed by the same die-forming and anvil components, and in which within the land, the anvil has a cavity, whereby to form at the opposite surface and at each fastener location a raised shape conforming to the cavity and integrally consolidated with the impregnation and with the formed fastener.

18. The method of claim 16 or claim 17, in which the anvil cavity is characterized by a wall having an intaglio formation therein.

19. The method of claim 16 or claim 17, in which the anvil cavity is characterized by a wall having a relief formation therein.

20. The method of claim 1 or claim 2, in which the reaction anvil is selected for peripherally continuous land application to the opposite surface of the substrate, and in which plural spaced fasteners are sequentially formed by the same die-forming and anvil components.

21. The method of claim 1 or claim 2, in which the reaction anvil is selected for peripherally continuous land application to the opposite surface of the substrate;

in which, within the land, the anvil has a cavity; in which another premeasured quantity of plastic working material is positioned within said cavity poor to commencement of compressional deformation; and in which the compressive energy is sufficient to soften the other premeasured quantity of plastic material, thereby consolidating the other premeasured quantity with the porous impregnation of the substrate and concurrently forming a molded shape in conformance with the cavity and on the oposite surface of the substrate.

* * * * *